Aug. 30, 1960 C. H. PERKINS 2,950,733
FLOW CONTROL DEVICE
Filed Oct. 25, 1957 3 Sheets-Sheet 1

INVENTOR.
Charles H. Perkins.
BY
Albert J. Henderson
ATTORNEY.

Aug. 30, 1960 C. H. PERKINS 2,950,733
FLOW CONTROL DEVICE
Filed Oct. 25, 1957 3 Sheets-Sheet 2

INVENTOR.
Charles H. Perkins.
BY
Albert J. Henderson
ATTORNEY.

Aug. 30, 1960    C. H. PERKINS    2,950,733
FLOW CONTROL DEVICE

Filed Oct. 25, 1957    3 Sheets-Sheet 3

INVENTOR.
Charles H. Perkins.
BY
ATTORNEY.

United States Patent Office 2,950,733
Patented Aug. 30, 1960

2,950,733
FLOW CONTROL DEVICE

Charles H. Perkins, Fountain City, Tenn., assignor to Robertshaw-Fulton Controls Company, Richmond, Va., a corporation of Delaware Filed Oct. 25, 1957, Ser. No. 692,328

13 Claims. (Cl. 137—495)

This invention relates generally to devices for controlling the flow of fluid through a conduit or the like and more particularly to valves for maintaining a constant flow of fluid to conduits irrespective of changes in fluid pressure in the conduit.

It is well known that a constant flow will be maintained through an orifice of fixed size when the pressure drop across the orifice is constant. Prior devices of this general type have utilized mechanical means for maintaining a constant flow through an orifice of fixed size by adjusting the pressure on the discharge side of the orifice to compensate for pressure changes in the supply side of the orifice to maintain a constant pressure differential therebetween.

In certain of these devices, a pressure responsive means, such as a corrugated, expansible and contractible metallic vessel, is subjected to pressures and actuates a valve member on the discharge or supply side of the orifice. An increase in pressure on the supply side of the orifice actuates the pressure responsive means to throttle down its associated valve to increase the pressure on the discharge side of the orifice to maintain a constant pressure drop across the orifice. The reverse of this action occurs when the pressure on the supply side of the orifice decreases and the pressure on the discharge side is decreased proportionately to maintain a constant pressure drop.

In these prior art devices, it has been necessary to provide some connecting means between the valve member and the pressure responsive means so that the valve member will move in response to movement of the pressure responsive means. When this connecting means takes the form of a valve stem which requires some sort of bearing means, there will be a tendency to reduce the accuracy of the flow control as a result of the friction between the valve stem and the bearing means.

It is an object of the invention to utilize the pressure responsive means of a constant flow valve of the above-indicated character as a valve member for controlling the pressure drop across an orifice means thereby eliminating the need for a connecting means between a separate valve member and pressure responsive means.

Another object of the invention is to utilize a combined pressure responsive means and valve member which is essentially friction-free in its operation in a valve of the above-indicated character.

Another object of the invention is to maintain a constant pressure drop across the orifice of a constant flow valve by controlling the effective flow area of the metering ports on the discharge side of the orifice.

Another object of the invention is to make the unbalanced force across the metering ports of a constant flow valve as small as necessary for accurate flow control.

In one preferred embodiment of the invention, the flexible diaphragm is positioned between two casings to define a supply chamber and a metering chamber. The flexible diaphragm contains an orifice of fixed size and is supported for movement in response to pressure variations on either the supply or the discharge side of the orifice. Metering ports are provided in communication with the metering chamber. The flexible diaphragm is cooperable with the metering ports to control the effective flow area thereof so that a constant pressure drop across the orifice will be maintained.

The above and other objects and features of the invention will appear more fully hereinafter from a consideration of the following description taken in connection with the accompanying drawings wherein four embodiments of the invention are illustrated by way of example.

In the drawings.

In all of the figures, corresponding parts are designated with corresponding reference numerals.

Figure 1:
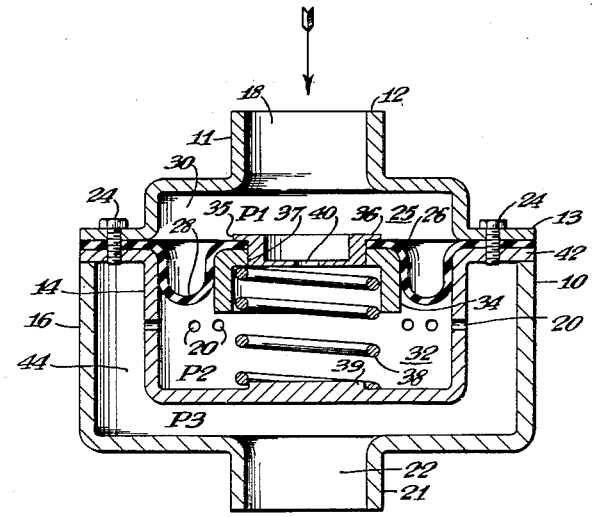
Fig. 1 is a cross-sectional view of a preferred embodiment of the invention.

Referring now more particularly to Fig. 1, the flow control device illustrated therein includes a cup-shaped inlet casing 12 having a cylindrical portion 11 of reduced diameter extending from the bottom wall thereof to form an inlet passage 18 and an outwardly-extending, annular flanged portion 13 at the open end thereof. A metering cylinder 14 having one open end and an outwardly-extending, annular flanged portion 42 at its open end is provided. By juxtaposing the flanged portions 13 and 42, the inlet casing 12 and metering cylinder 14 define a flow control chamber 25 therebetween. Bolts 24 pass through the flanged portions 13 and 42 and are threadedly mounted therein to secure the inlet casing 12 and metering cylinder 14 together. Metering cylinder 14 contains a plurality of radially spaced metering ports 20 in the side wall thereof.

A cup-shaped outlet casing 16 is secured at its open end to the flanged portion 42, as by welding, to enclose metering cylinder 14 and define therewith an annular outlet chamber 44 in communication with metering ports 20. Outlet casing 16 has a cylindrical portion 21 of reduced diameter extending from the bottom wall thereof to form an outlet passage 22. Outlet passage 22 is in axial alignment with inlet passage 18.

A flexible diaphragm 26 having an outer diameter equal to that of flanged portions 13 and 42 is supported at its outer diameter between flanged portions 13 and 42 and at its inner diameter between support plate 34 and an annular flange 35 of a cup-shaped orifice plate 36. Flexible diaphragm 26 has one annular convolution 28 and, along with orifice plate 36, divides the flow chamber 25 into two chambers by defining a supply chamber 30 with inlet casing 12 and a metering chamber 32 in metering casing 14.

Orifice plate 36 is secured tightly within a central opening 37 in support plate 34 and contains an orifice 40 in the bottom wall thereof. Support plate 34 is cup-shaped and is mounted on load spring 38 with the open end of the plate facing the bottom wall of metering cylinder 14. The load spring 38 is positioned between the bottom wall of metering cylinder 14 and the bottom wall of support plate 34. The bottom wall of metering cylinder 14 has a raised portion 39 for retaining the spring 38 in its operating position.

In the operation of the embodiment shown in Fig. 1, fluid enters the valve through passage 18 of inlet casing 12 and passes into supply chamber 30. Fluid will then pass from supply chamber 30 to metering chamber 32 through orifice 40, through metering ports 20 to outlet chamber 44, and out of the valve through outlet passage 22. The fluid undergoes a pressure drop from $P_1$ to $P_2$ as it passes through orifice 40. This pressure differential produces a force which causes the flexible diaphragm 26 and support plate 34 to compress spring 38. Spring 38 develops a load, in accordance with its spring rate, equal in magnitude but opposite in direction to such compressing force and in response to a predetermined pressure drop $P_1$ to $P_2$, spring 38 will hold the flexible diaphragm 26 and support plate 34 in an equilibrium position as shown in Fig. 1.

When the pressure drop ($P_1$ to $P_2$) begins to exceed this predetermined value, the flexible diaphragm 26 and support plate 34 move in a direction tending to further compress the spring 38. The flexible diaphragm 26 will tend to roll down the inside wall of metering cylinder 14 across the metering ports 20 thereby restricting the flow of fluid therethrough. This restriction of flow will decrease the value of the pressure drop until it reaches the initial predetermined value. Therefore, the constant flow through orifice 40 will exist for all pressure drops across the valve that are in excess of the predetermined pressure drop.

Figure 2:
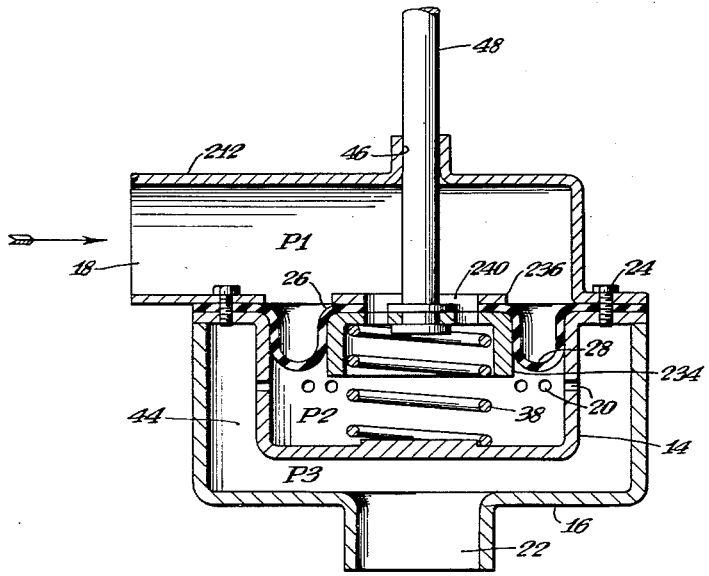
Fig. 2 is a cross-sectional view of a second embodiment of the invention.

In the embodiment of the invention shown in Fig. 2, a stem member 48 is fixed at one end thereof to the center of support plate 234. An orifice cylinder 236 having an orifice 240 is mounted on support plate 234. The other end of stem member 48 extends through opening 46 in inlet casing 212 toward a point externally of the valve. Hence, the flow of fluid through the valve may be externally controlled by means of stem 48. In all respects, the construction and operation of the Fig. 2 embodiment is similar to the Fig. 1 embodiment hereinbefore described.

Figure 3:
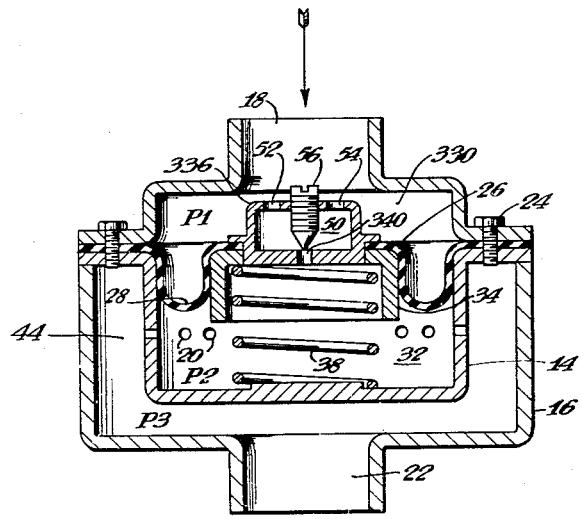
Fig. 3 is a cross-sectional view of a third embodiment of the invention.

The embodiment shown in Fig. 3 is substantially the same as that shown in Fig. 1, the only difference being that an adjustable orifice cylinder 336 is used instead of a fixed orifice cylinder. Orifice cylinder 336 defines an orifice chamber 50 and includes a pair of inlet ports 52, 54 providing a flow passage from supply chamber 330 to orifice chamber 50. Orifice cylinder 336 also has an orifice 340 providing a flow passage for a flow of fluid from orifice chamber 50 to metering chamber 32. A pointed stem member 56 is threadedly mounted in orifice cylinder 336 for movement into orifice 340 to vary the effective flow area thereof. By using the adjustable orifice of the Fig. 3 embodiment, a constant flow valve that may be adjusted for a variety of flow rates will result.

Figure 4:
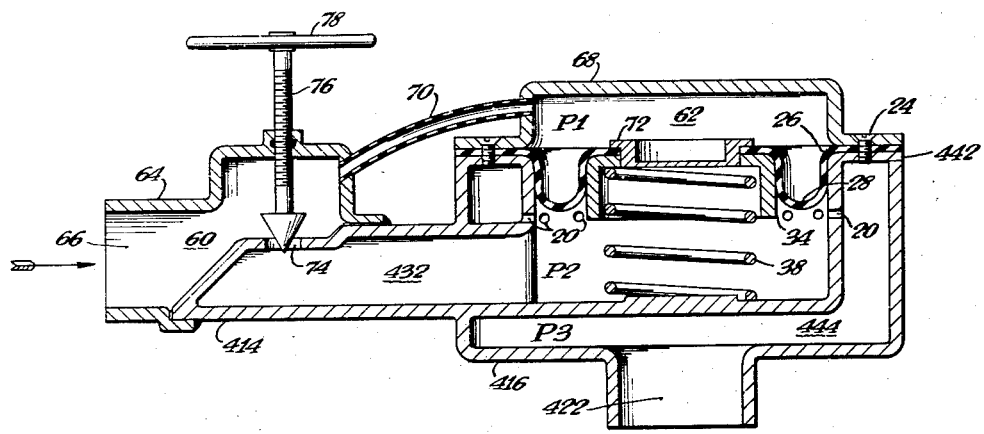
Fig. 4 is a cross-sectional view of a fourth embodiment of the invention.

Fig. 4 illustrates another embodiment of the invention in which an adjustable orifice is used. In the device there shown, two supply compartments 60, 62 are provided. Compartment 60 is defined by inlet casing 64, which contains an inlet passage 66 for a flow of fluid into the valve, and compartment 62 is defined by inlet casing 68. Compartments 60, 62 are interconnected by a conduit 70. A metering casing 414 is secured to inlet casings 64, 68 by suitable means, such as bolts 24 in the case of casing 68 or welding in the case of casing 64. Flexible diaphragm 26 is disposed between inlet casing 68 and metering casing 414 and is supported at the center thereof by support plate 34, spring 38 and cylinder 72 in a manner similar to that of the Fig. 1 device. It is to be noted that cylinder 72 has no orifice therein; however, metering casing 414 is provided with an orifice 74 defining a flow passage between supply compartment 60 and metering chamber 432. Metering casing 414 also contains radially spaced metering ports 20 therein. An outlet casing 416 is secured to a flanged portion 442 in metering chamber 414, as by welding, to form an outlet chamber 444 therewith. Outlet casing 416 contains an outlet passage 422 for the flow of fluid from the valve.

A pointed stem member 76 having a handle 78 is threadedly mounted in inlet casing 64 for movement into orifice 74 to vary the effective flow area thereof. Hence, the Fig. 4 embodiment illustrates a constant flow valve similar to the valve of Fig. 1 in its operation and operable within a variety of flow rates.

Figure 5:
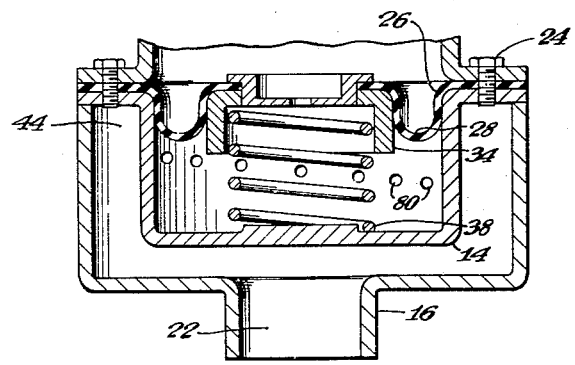
Fig. 5 is a fragmentary, cross-sectional view of a modified detail of the invention.
Figure 6:
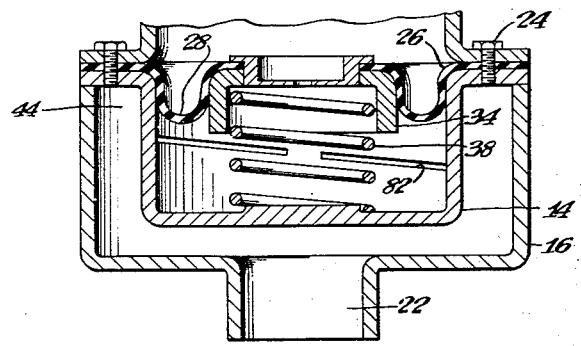
Fig. 6 is a fragmentary, cross-sectional view of another modified detail of the invention.

Fig. 5 shows a metering cylinder 14 having helically spaced ports 80 therein and Fig. 6 shows a metering cylinder 14 with helically spaced slots 82 therein. By spacing the metering ports of a metering cylinder 14 in a helical manner, the amount of opening of these ports per unit movement of the annular convolution 28 of the flexible diaphragm 26 may be varied by changing either the angle of the helix or the spacing of the ports. Since there is a pressure drop $P_2$ to $P_3$ across the portion of the annular convolution 28 of the flexible diaphragm 26, when this portion of the diaphragm is covering or uncovering the metering ports, an unbalanced force is set up which resists the uncovering of the ports and assists the covering of such ports. This unbalanced force may be made as small as necessary for accurate control by the spacing of the ports along a helix. It will be understood that either helical ports 80 or helical slots 82 may be used in any of the embodiments shown in Figs. 1 to 4 in place of the radially spaced ports 20.

In the application of this invention, the predetermined pressure drop $P_1$ to $P_2$ may be made very low (approximately 5 p.s.i.) and the valve parts may be made structurally strong enough so that the valve may have a useful operating pressure range of approximately 5 to 150 p.s.i.

An advantage of this invention is that the device is essentially friction-free as the result of the rolling action of the flexible diaphragm 26 thereby contributing to the accuracy of the flow control.

Another advantage of this invention is that the constant flow valve may be used on either well-strained liquids or liquids having suspended particles of dirt or foreign matter therein. The only restriction on the size of the particles is that it must be small enough to pass through the metering ports 20. It will be apparent that since there are no close fitting or sliding parts and since the only relative movement of the parts is the rolling action of the flexible diaphragm 26 against the metering cylinder 14, it is very unlikely that dirt or other foreign material will cause this constant flow valve to stick or otherwise become inoperative.

It is to be understood that although several embodiments of this invention have been shown and described, the invention can be variously embodied and changes may be made in the construction and arrangement of parts without departing from the scope of the invention as defined by the appended claims.

I claim:

1. In a flow control device, the combination comprising a first casing having an inlet passage for a flow of fluid, a second casing having port means for a flow of fluid therethrough, said first and second casings being juxtapositioned to define a flow control chamber therebetween, means communicating with said port means for receiving the flow of fluid therefrom and having an outlet passage for the flow of fluid from said flow control device, flow control means within said flow control chamber including a valve means mounted for movement between flow controlling positions to restrict the flow of fluid through said port means and restricted orifice means defining a passage for the flow of fluid from said inlet passage to said port means, said valve means dividing said flow control chamber into a first chamber communicating with said inlet passage and a second chamber communicating with said port means, means connected to said valve means for controlling the flow controlling position thereof from a point externally of said flow control chamber, said valve means comprising a flexible diaphragm cooperable with said second casing to increase the effective flow control area of said port means in response to the fluid pressure differential between said first and second chambers, and yieldable means operably disposed in said second chamber and biasing said flexible diaphragm out of cooperation with said second casing to decrease the effective flow control area of said port means.

2. A flow control device as claimed in claim 1 wherein said means for controlling the flow controlling position of said valve means from a point externally of said flow control chamber comprises a stem member having one end thereof connected to said valve means and the other end thereof projecting through said first casing to a point externally of said first casing.

3. In a flow control device, the combination comprising a first casing having an inlet passage for a flow of fluid, a second casing having port means for a flow of fluid therethrough, said first and second casings being juxtapositioned to define a flow control chamber therebetween, means communicating with said port means for receiving a flow of fluid therefrom and having an outlet passage for a flow of fluid, flow control means within said flow control chamber, a supply compartment in said flow control chamber defined by said first casing and said flow control means, a metering compartment in said flow control chamber defined by said second casing and said flow control means, said flow control means including restricted orifice means defining a flow passage for the flow of fluid from said supply compartment to said metering compartment and a valve means movable between flow controlling positions to restrict the flow of fluid through said port means, said valve means comprising a flexible diaphragm member movable into engagement with said second casing in response to the fluid pressure differential between said supply and metering compartments to cover said port means, yieldable means biasing said flexible diaphragm in a direction to uncover said port means, and means cooperable with said orifice means for regulating the effective flow area of the flow passage defined thereby, said valve means being operable to control the effective flow area of said port means to maintain a constant pressure drop across said orifice means.

4. A flow control device as claimed in claim 3 wherein said means for regulating the effective flow area of the flow passage defined by said restricted orifice means comprises a stem member adjustably mounted for movement into various positions.

5. In a flow control device, the combination comprising a first chamber means including a first housing having an inlet passage for a flow of fluid, a second housing and means interconnecting said first and second housings for a flow of fluid therebetween, a second chamber means having port means for a flow of fluid therethrough, said first and second chamber means being juxtapositioned to define a flow control chamber therebetween, means communicating with said port means for receiving a flow of fluid therefrom and having an outlet passage for a flow of fluid, flow control means within said flow control chamber having restricted orifice means defining a passage for a flow of fluid and a valve means movable between flow controlling positions to restrict the flow of fluid through said port means, a first supply compartment in said flow control chamber defined by said orifice means and said first housing of said first chamber means, a second supply compartment in said flow control chamber defined by said valve means and said second housing of said first chamber means, a metering compartment in said flow control chamber defined by said valve means and said orifice means in conjunction with said second chamber means, means cooperable with said orifice means for regulating the effective flow area of the flow passage defined by said orifice means, said valve means comprising a flexible diaphragm operably engageable with said port means to decrease the effective flow area of said port means in response to the fluid pressure differential between said second supply compartment and said metering compartment, and yieldable means biasing said flexible diaphragm away from engagement with said port means to increase the effective flow area thereof.

6. A flow control device as claimed in claim 5 wherein said means for regulating the effective flow area of the flow passage defined by said restricted orifice means comprises a pointed stem adjustably mounted and having a portion thereof extending externally of the first supply compartment.

7. In a flow control device, the combination comprising a casing having an inlet and an outlet, a wall means in said casing defining a flow control chamber therein, port means in said wall means defining a flow passageway between said flow control chamber and said outlet, means defining a restricted flow passageway between said inlet and said port means, valve means positioned within said flow control chamber for dividing the same into a first chamber in communication with said inlet and a second chamber in communication with said port means, said valve means comprising a flexible diaphragm member movable into engagement with said wall means in response to the fluid pressure differential between said first and second chambers to cover said port means, and yieldable means biasing said flexible diaphragm in a direction to uncover said port means.

8. A device as claimed in claim 7 wherein said wall means is substantially cylindrical and said flexible diaphragm member has an annular convolution and is positioned for rolling engagement with said wall means during said movement thereof.

9. A device as claimed in claim 8 wherein said yieldable means for biasing said flexible diaphragm in a direction to uncover said port means comprises a coil spring mounted in said second chamber.

10. A flow control device as claimed in claim 7 wherein said means defining a restricted flow passageway between said inlet and said port means includes an orifice member carried by said flexible diaphragm.

11. A flow control device as claimed in claim 8 wherein the port means of said second casing comprises a plurality of circumferentially spaced ports.

12. A flow control device as claimed in claim 8 wherein said port means of said second casing comprises a plurality of helically spaced ports.

13. A flow control device as claimed in claim 8 wherein said port means of said second casing comprises a plurality of helically spaced slots.

References Cited in the file of this patent

UNITED STATES PATENTS

| | | |
|---|---|---|
| 611,519 | Simmance | Sept. 27, 1898 |
| 2,069,022 | Sisk | Jan. 26, 1937 |
| 2,219,408 | Benz et al. | Oct. 29, 1940 |
| 2,615,675 | Mellert | Oct. 28, 1952 |
| 2,736,332 | Simmons | Feb. 29, 1956 |
| 2,777,464 | Mosely | Jan. 15, 1957 |

FOREIGN PATENTS

| | | |
|---|---|---|
| 133,564 | Australia | July 18, 1949 |